(12) United States Patent
Diez Herrera

(10) Patent No.: US 8,904,607 B2
(45) Date of Patent: Dec. 9, 2014

(54) FASTENING DEVICE

(75) Inventor: Victor Diez Herrera, Barcelona (ES)

(73) Assignee: Illinois Tool Works Inc., Glenview, IL (US)

( * ) Notice: Subject to any disclaimer, the term of this patent is extended or adjusted under 35 U.S.C. 154(b) by 163 days.

(21) Appl. No.: 13/255,821

(22) PCT Filed: Feb. 24, 2010

(86) PCT No.: PCT/US2010/025144
§ 371 (c)(1),
(2), (4) Date: Sep. 9, 2011

(87) PCT Pub. No.: WO2010/104674
PCT Pub. Date: Sep. 16, 2010

(65) Prior Publication Data
US 2011/0314642 A1 Dec. 29, 2011

(30) Foreign Application Priority Data
Mar. 11, 2009 (ES) .................................. 200900740

(51) Int. Cl.
*F16B 2/24* (2006.01)
*F16B 5/12* (2006.01)
*B60N 3/02* (2006.01)
*F16B 21/07* (2006.01)
*B60R 13/02* (2006.01)

(52) U.S. Cl.
CPC ............ *F16B 21/075* (2013.01); *B60R 13/0206* (2013.01); *F16B 5/126* (2013.01); *B60N 3/026* (2013.01)
USPC ................ 24/295; 24/292; 24/458; 52/716.7; 52/718.03

(58) Field of Classification Search
USPC .............. 24/293, 289, 295, 292, 573.09, 297, 24/453, 458, 581.11, 294; 52/716.5, 52/716.7, 718.03; 411/508
See application file for complete search history.

(56) References Cited

U.S. PATENT DOCUMENTS

| 5,533,237 A | * | 7/1996 | Higgins ........................ 24/289 |
| 5,671,513 A | * | 9/1997 | Kawahara et al. ......... 24/581.11 |
| 5,774,949 A | * | 7/1998 | Cornell et al. ................ 24/293 |
| 7,051,408 B2 | | 5/2006 | De Azevedo et al. |
| 7,874,048 B2 | * | 1/2011 | Katoh et al. .................... 24/297 |

(Continued)

FOREIGN PATENT DOCUMENTS

| EP | 1482184 A2 | 12/2004 |
| ES | 2138528 A1 | 1/2000 |

OTHER PUBLICATIONS

ISR for PCT/US2010/025144 dated Jun. 15, 2010.

*Primary Examiner* — Robert J Sandy
*Assistant Examiner* — Michael Lee
(74) *Attorney, Agent, or Firm* — Lowe Hauptman & Ham LLP

(57) ABSTRACT

A fastening device includes a clip and a retaining element. The clip has a head from which lateral wings for fastening to a panel and resilient lugs for fastening the retaining element to the clip extend laterally. The retaining element temporarily fastened inside the clip is inserted in this state inside a mounting hole or opening where final fastening of the device to the panel is performed. The retaining element has an internal cavity for disassembling the clip. The resilient lugs have a fold from which they extend so as to form inner wings which are provided with an opening. Upon insertion of the retaining element, projections of the retaining element engage inside the opening.

10 Claims, 2 Drawing Sheets

(56) References Cited

U.S. PATENT DOCUMENTS

| | | | |
|---|---|---|---|
| 8,474,111 B2 * | 7/2013 | Ribes Marti | 24/458 |
| 2005/0000063 A1 | 1/2005 | De Azevedo et al. | |
| 2009/0064470 A1 * | 3/2009 | Hosoya et al. | 24/458 |
| 2011/0203081 A1 * | 8/2011 | Iwahara et al. | 24/458 |

\* cited by examiner

FASTENING DEVICE

RELATED APPLICATIONS

The present application is national phase of PCT/US2010/025144 filed Feb. 24, 2010, and claims priority from Spanish Application Number 200900740 filed Mar. 11, 2009.

FIELD OF THE INVENTION

The present invention relates to a fastening device, of the type composed of a clip and a retaining element, such as those which are used for mounting self-supporting parts for the internal trim of vehicles and/or accessories for the panels thereof, said clip being designed such that the retaining element is engaged inside said clip by means of a single mounting operation, there being provided means for disassembly of the device.

PRIOR ART

The automobile industry uses a large variety of clips and parts for fastening panels and accessories for said panels. A common problem of said devices is that it is impossible to access the top part of the panels for easy mounting thereof, so that, in order to fasten them, it is required to use parts which can be inserted in the opening formed in the panel, the type of clip which falls within the field of the present invention exerting its resilient retaining force such that at least some of its parts are operated from the top or blind zone of the panel.

One of the many functions which the automobile industry requires of said devices is, for example, that of fastening self-supporting panels using a retaining element (shank, screw, pin, etc.) which, engaging inside the clip, completes the fastening system.

European patent EP0743461 describes a device of this type in which the clip has an open rectangular base having, extending therefrom, a respective pair of opposite resilient lugs in the form of a clamp. The retaining element is a shank with a rectangular cross-section and open sides inside which, during insertion in the clip, said resilient lugs are engaged, performing fastening. The clip has means for disassembly thereof, including a cavity present in the retaining element allowing the insertion of a tool which opens, upon being rotated, the resilient lugs of the clip, releasing the retaining element.

Spanish patent ES2144936, which describes improvements to the main Spanish patent P9700865, illustrates a fastening assembly of the type described in a clip having a structure different from the previous one. The peg is joined by any means to the accessory to be fixed to the panel and is fitted in the clip so that the head of the peg projects beyond the clamping or end zone of the lugs of the clip which engage inside a depression or stepped part of said peg. The peg has an internal cavity which allows the insertion of a screwdriver, rotation of which splays the lugs of the clip, freeing the head of the peg and allowing removal thereof.

Assembly of the clips described generally requires a prior operation involving insertion of the clip, in a preset position, and a subsequent insertion of the retaining element and engagement thereof inside the clip.

Moreover, said clips are designed with an approximately conical configuration which facilitates their insertion inside the panel opening. It is the base of the clip, from where its resilient lugs extend, which forms a sandwich-like structure surrounding said panel together with the clip.

It may also be advantageous to have a fastening device in which the resilient force for retaining the panel is more effective and fastening is more secure, while reducing its height so as to allow assembly thereof in confined areas of the vehicle.

The constructional nature of the prior art is such that it cannot be assembled economically by means of a single operation involving insertion of the clip together with peg or retaining element, since its conical structure which allows insertion into the panel opening breaks when the retaining element is inserted in the clip, said action splaying the lugs thereof, usually substantially more so than compared to its original rest position as the distance between the clip base and the panel increases.

Finally, another of the objects of the present invention is to provide a fastening device which allows, in the operating conditions described, fitting of said device with maximum economy in terms of movements, thus facilitating easy mounting thereof.

These and other objects of the invention will become clear during the course of the description of the invention which is provided below.

BRIEF DESCRIPTION OF THE INVENTION

The present invention describes a fastening device formed by a clip and a retaining element in which the clip, which is made of any suitable material and, for example, is formed by means of a single operation involving punching of a sheet-like piece, has a general curved, arch-like and/or conical configuration, the end or head of which forms the rounded base from which respective lugs extend, these having on their inner face, towards the inside of the clip, means for interfering together with the retaining element—said means being of the pawl or interlocking type—for example via openings in said lugs inside which stops present in the retaining element engage.

The clip of the device has flexible wings which provide a surface for allowing resting thereof against the blind surface of the panel.

The retaining element has an internal cavity which allows insertion of a tool for performing both disengagement of the retaining element as well as release of the clip and disassembly thereof.

BRIEF DESCRIPTION OF THE DRAWINGS

The invention is illustrated more clearly with the aid of the accompanying set of drawings provided solely by way of a non-limiting example of the invention.

DETAILED DESCRIPTION OF THE INVENTION

Figure 1:
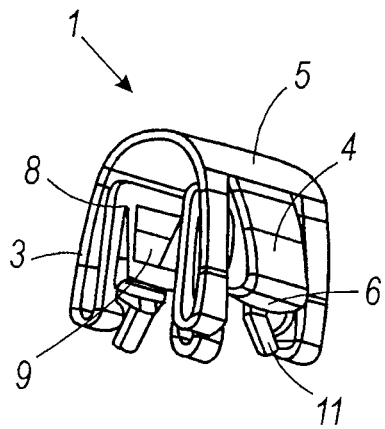
FIG. 1 shows a perspective view of the preferred embodiment of a clip of the fastening device according to the present invention.
Figure 2:
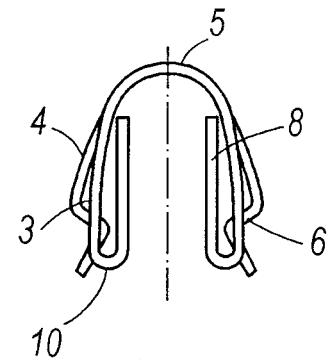
FIG. 2 shows an elevation view of the clip according to the preceding figure.
Figure 3:
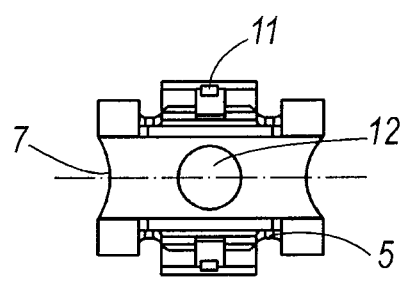
FIG. 3 is a bottom plan view of the clip according to the preceding figures.
Figure 4:
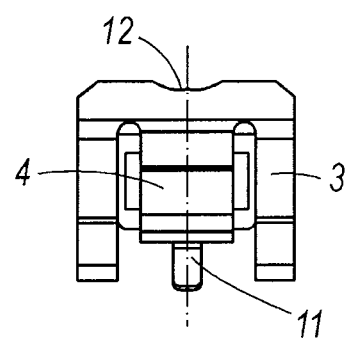
FIG. 4 is a side elevation view of the clip according to the preceding figures.
Figure 5:
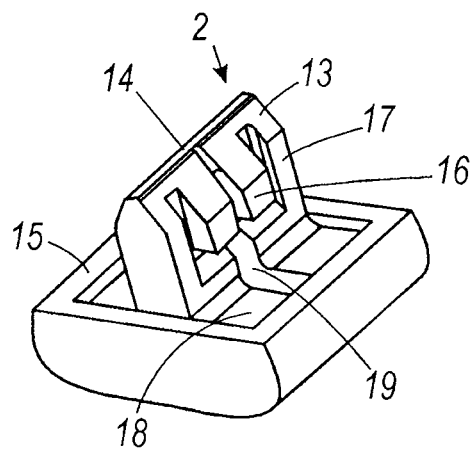
FIG. 5 is a perspective view of a retaining element, in a possible embodiment thereof according to the present invention, to be used with the clip in the embodiment according to the preceding figures.
Figure 6:
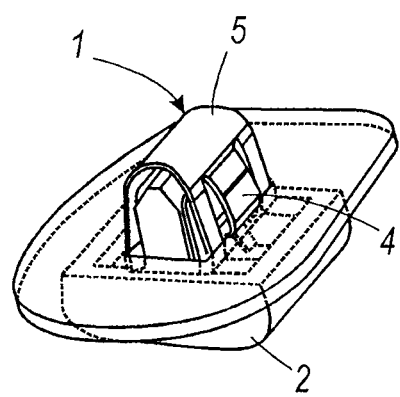
FIG. 6 is a schematic perspective illustration of assembly of the fastening device according to the present invention using the parts shown in the embodiment according to the preceding figures.
Figure 7:
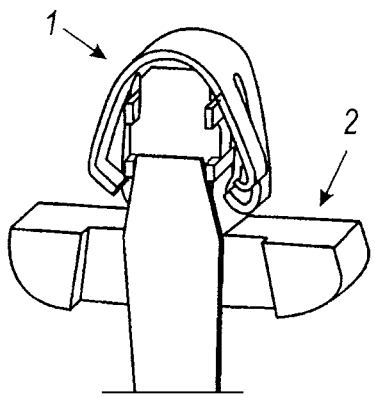
FIG. 7 shows a perspective illustration of the process for disassembly of the device according to the invention, showing a cross-section through the assembly according to the preceding figure.

The present invention provides a fastening device which comprises a clip (1) and a retaining element (2) which are made of any suitable material and used for mounting self-supporting parts for the internal trim of vehicles and/or accessories for the panels thereof, it being possible to fasten another object where required, by providing said clip (1) with lateral wings (4) for fastening to the panel and with resilient lugs (3) for fastening said retaining element (2).

In order to facilitate its insertion in the opening formed in the panel for assembly thereof, the clip (1) has an approximately arch-shaped and/or conical form, the head of which is a rounded central zone or surface (5) which extends laterally both so as to form said lateral wings (4) which have a surface (6) for resting against the panel and so as to form said resilient lugs (3) which are provided with a mechanism for retaining the retaining element (2).

Subject to variations within each practical embodiment, said retaining mechanism is achieved by means of interference of a projection with an opening or cavity in the other body. For example, in the embodiments shown in the figures, said resilient lugs (3) have a fold from which they extend so as to form inner wings (8) which are provided with an opening (9). An interfering projection (16) present in the part of the retaining element or retaining element (2) engages inside said opening (9).

Fastening said opening (9) to the rest of the structure of the clip (1) is designed to facilitate its resilient movement during mounting of the retaining element (2) on the clip (1).

It must be remembered that, in the field of application of the fastening device according to the present invention, the inner zone of the panel is blind and can be accessed solely via the opening present in the panel. The clip is designed so as to be completely inserted inside said opening so as to remain fixed and be held in the panel owing to the action of the retaining element (2).

As can be understood from the figures, the clip (1) is introduced into the opening of the panel with an action where its rounded end form and general arched and/or conical configuration facilitates said operation. The insertion of the clip (1) into the hole or opening in the panel must be performed by pre-assembling said retaining element (2) on the clip.

When the clip (1) is inserted into the panel opening, it interferes therewith by means of splaying of the lateral wings (4) during which its contact surfaces (6) press against the edge of the panel opening.

It should be noted that the clip (1) is provided, in its upper curved surface or rounded central joining zone (5), with respective depressions (7) intended to facilitate insertion and removal of the clip (1) into/from the rectangular opening of the panel.

The retaining element or retaining element (2), according to the embodiment described above, has on its inner face, opposite to the outer face and visible for example from the inside of the vehicle passenger compartment, a zone (15) for making contact with the panel and an undercut or seat (18) in the base of the clip. In its central part a shank for insertion inside the clip extends upwards and has interfering projections (16) and zones (17) for internally supporting the clip, terminating in a surface (13) for entry of the retaining element into the clip, forming at the top a central reinforcement (14) of said retaining element (2).

The retaining element (2) has internally a disassembly cavity (19) which allows the insertion of disassembly tools inside the assembly including clip (1) and retaining element (2), so as to allow proper disengagement of the interfering projections (16) from the openings (9) by means of the action exerted on the disassembly flanges (10) of said clip, which action releases the connection between the clip (1) and the retaining element (2), or else disassembly of the entire device from the panel with the retaining element (2) by means of a pressure exerted on the disassembly flanges (11).

Said cavity (19) is sufficiently broad to facilitate disassembly of the device from its fastening members which are close to the panel zone, for which purpose in said embodiment it is at least approximately more than 50% of the breadth of the retaining element (2).

In this way all the predefined objects have been achieved: on the one hand, a fastening device intended to be used in blind holes of panels for fastening accessory parts in motor vehicles and able to be inserted by means of a single simple action involving introduction of the assembly into the opening provided for this purpose in the panel.

The invention advantageously also provides a fastening device which ensures optimum mounting and efficiency of the device since the form of the clip facilitates handling thereof both during insertion and during disassembly thereof, without parts which are situated distant from the panel and splaying of which makes extraction thereof difficult. Owing to its constructional form where its resilient parts for performing fastening both to the panel and to the retaining element extend from a common inner surface which is situated far from the panel, the simultaneous introduction of the clip (1) together with the retaining element (2) is possible since the conical form for insertion of the assembly does not break.

The clip (1) has a top hole (12) which, in addition to increasing the reliability during manufacture of the clip itself, reduces the rigidity of the part and increases the resilience of its lugs and lateral wings.

Figure 8:
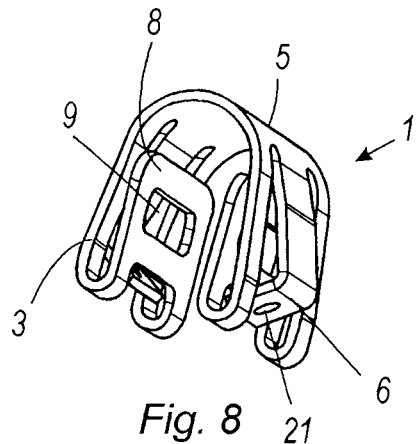
FIG. 8 shows a perspective view of another possible embodiment of a clip according to the present invention.
Figure 9:
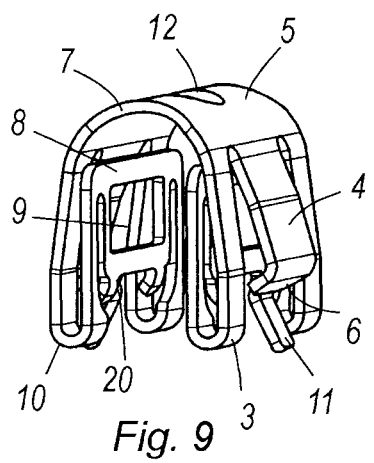
FIG. 9 shows a perspective view of another different possible embodiment of a clip according to the present invention.
Figure 10:
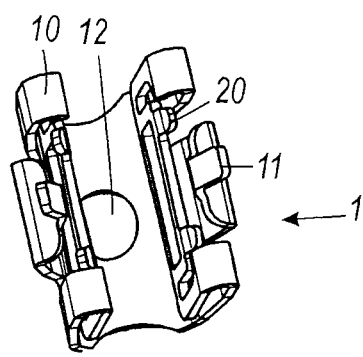
FIG. 10 shows a bottom view of the clip according to the preceding figure.
Figure 11:
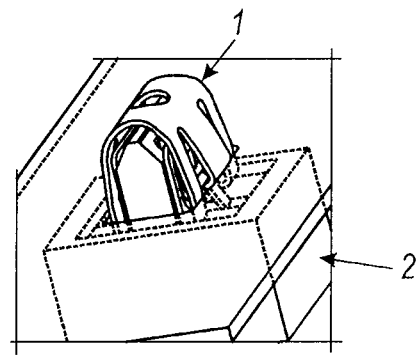
FIG. 11 shows a schematic perspective view of assembly of the fastening device according to the present invention using the parts shown in FIGS. 9 and 10.
Figure 12:
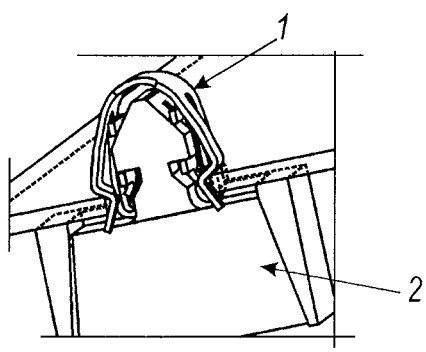
FIG. 12 is a perspective view of a cross-section through the joint shown in the preceding figure.

Compared to the previous preferred embodiment, the embodiment shown in FIG. 8 has slight variations in respect of the clip (1) which do not alter the basic inventive idea. This clip (1) has disassembly holes in the contact surface (6) of the lateral wings (4).

FIGS. 9 to 12 show another of the preferred embodiments of the present invention, being fairly similar to the first embodiment described above.

As can be seen from the drawings, in this variation there are flanges (20) in the bottom zone of the openings (9) which are intended, together with the entry surface (13) of the retaining element (2), to facilitate the engagement of the openings (9) with the interfering projections (16).

In the present description there is no mention of the possible means for connecting together said retaining element (2)

and the part which in each example of embodiment is used for connection to the panel, in cases where required. Said means may be of any nature or form.

It is understood that the scope of the invention includes those modifications to the design and form which do not alter the basic idea thereof.

What is claimed is:

1. A FASTENING DEVICE which comprises a clip and a retaining element which are made of any suitable material and used for mounting self-supporting parts for the internal trim of vehicles and/or accessories for the panels thereof, it being possible to fasten another object where required, in which said clip in the rest condition has a form with a general arch-shaped, being provided with a head or rounded central surface from where both lateral wings for fastening to the panel as well as resilient lugs for fastening the retaining element to said clip extend laterally, there being provided means for fastening the retaining element inside the clip and said retaining element having an internal cavity, said device being configured for assembly with said retaining element inside said clip providing temporary fastening of said retaining element in said clip, so as to be inserted in this state inside a mounting hole or opening where final fastening of the device to the vehicle panel is performed, CHARACTERIZED IN THAT said resilient lugs have a fold from which extend inner wings which are provided with an opening inside which, upon insertion of said retaining element, projections thereof engage.

2. THE FASTENING DEVICE as claimed in claim 1, CHARACTERIZED IN THAT said clip has means which facilitate the mounting and removal of both said retaining element with respect to said clip and of said clip with respect to said panel.

3. THE FASTENING DEVICE as claimed in claim 1, CHARACTERIZED IN THAT said clip is provided with a top hole in said rounded central surface.

4. THE FASTENING DEVICE as claimed in claim 1, CHARACTERIZED IN THAT said retaining element has on its inner face a zone for making contact with the panel and an undercut or seat in the base of the clip, a shank for insertion inside said clip extending upwards from its central part and terminating in an entry surface of said retaining element.

5. THE FASTENING DEVICE as claimed in claim 1, CHARACTERIZED IN THAT said retaining element has a central reinforcement.

6. THE FASTENING DEVICE as claimed in claim 1, CHARACTERIZED IN THAT said retaining element has said internal cavity for disassembly of the clip defining a clearance which is approximately at least more than 50% of the breadth thereof, facilitating disassembly of the device.

7. The FASTENING DEVICE as claimed in claim 2, CHARACTERIZED IN THAT said means which facilitate the mounting and removal of said retaining element with respect to said clip are defined by flanges on the inner wings situated in a zone adjacent to the openings and closest to the panel.

8. THE FASTENING DEVICE as claimed in claim 1, CHARACTERIZED IN THAT said openings in said inner wing are partly detached therefrom, being connected only along one of its sides.

9. The FASTENING DEVICE as claimed in claim 2, CHARACTERIZED IN THAT said means which facilitate the mounting and removal of said clip with respect to said panel are defined by said lateral wings of said clip provided with holes for facilitating removal of the clip from the panel.

10. The FASTENING DEVICE as claimed in claim 2, CHARACTERIZED IN THAT said means which facilitate the mounting and removal of said clip with respect to said panel are defined by said lateral wings of said clip having a fold which forms flanges for disassembly of said clip from the panel.

* * * * *